(12) United States Patent
Grigg et al.

(10) Patent No.: US 9,628,495 B2
(45) Date of Patent: *Apr. 18, 2017

(54) SELF-SELECTED USER ACCESS BASED ON SPECIFIC AUTHENTICATION TYPES

(71) Applicant: BANK OF AMERICA CORPORATION, Charlotte, NC (US)

(72) Inventors: David M. Grigg, Rock Hill, SC (US); Joseph Neil Johansen, Rock Hill, SC (US); Carrie Anne Hanson, Charlotte, NC (US); Charles Jason Burrell, Middleburg, FL (US); Elizabeth S. Votaw, Potomac, MD (US)

(73) Assignee: BANK OF AMERICA CORPORATION, Charlotte, NC (US)

( * ) Notice: Subject to any disclaimer, the term of this patent is extended or adjusted under 35 U.S.C. 154(b) by 0 days.

This patent is subject to a terminal disclaimer.

(21) Appl. No.: 15/046,356

(22) Filed: Feb. 17, 2016

(65) Prior Publication Data

US 2016/0165447 A1 Jun. 9, 2016

Related U.S. Application Data

(63) Continuation of application No. 14/175,672, filed on Feb. 7, 2014, now Pat. No. 9,286,450.

(51) Int. Cl.
*G06F 7/04* (2006.01)
*G06F 15/16* (2006.01)
(Continued)

(52) U.S. Cl.
CPC ...... *H04L 63/105* (2013.01); *G06F 17/30312* (2013.01); *G06F 17/30528* (2013.01);
(Continued)

(58) Field of Classification Search
CPC ....................................................... G06F 21/31
(Continued)

(56) References Cited

U.S. PATENT DOCUMENTS 3,256,670 A 6/1966 Ennio
3,261,093 A 7/1966 Reswick
(Continued)

FOREIGN PATENT DOCUMENTS

EP 1132876 A2 9/2001
WO 2012058099 A1 5/2012
WO 2013095486 A1 6/2013

OTHER PUBLICATIONS

QThru.com. "QThru: use your mobile smartphone for self-check-out." http://www.qthru.comi. QThru.com 2011. 6 pages. Retrieved Mar. 22, 2013.
(Continued)

*Primary Examiner* — Taghi Arani
*Assistant Examiner* — Khalil Naghdali
(74) *Attorney, Agent, or Firm* — Michael A. Springs; Moore & Van Allen PLLC; W. Kevin Ransom

(57) ABSTRACT

Embodiments of the invention are directed to a system, method, and a computer program product self-selected user access based on specific authentication types. The system typically including a memory, a processor, and a module configured to receive from a user, a user-selected preference, wherein the user-selected preference comprises one or more authentication types desired by the user; determine a level of authentication from a plurality of levels of authentication are associated with the one or more authentication types associated with the user-selected preference; initiate the presentation of a user interface that enables the user to select one or more application functions, wherein the one or more application functions are associated with the determined (Continued)

level of authentication; receive from a user, a selection of one or more application functions.

16 Claims, 9 Drawing Sheets

(51) Int. Cl.
    *G06F 17/30* (2006.01)
    *H04L 29/06* (2006.01)
    *G06F 21/31* (2013.01)
    *H04W 12/06* (2009.01)
    *G06Q 40/02* (2012.01)

(52) U.S. Cl.
    CPC ........ *G06F 17/30867* (2013.01); *G06F 21/31* (2013.01); *G06Q 40/02* (2013.01); *H04L 63/083* (2013.01); *H04L 63/0823* (2013.01); *H04L 63/0853* (2013.01); *H04L 63/0861* (2013.01); *H04L 63/0876* (2013.01); *H04L 63/107* (2013.01); *H04W 12/06* (2013.01)

(58) Field of Classification Search
    USPC .......................................................... 726/7
    See application file for complete search history.

(56) References Cited

U.S. PATENT DOCUMENTS

| | | | |
|---|---|---|---|
| 3,295,812 A | 1/1967 | Ernst | |
| 4,766,293 A | 8/1988 | Boston et al. | |
| 5,437,346 A | 8/1995 | Dumont | |
| 5,438,186 A | 8/1995 | Nair et al. | |
| 6,119,103 A | 9/2000 | Basch et al. | |
| 6,254,000 B1 | 7/2001 | Degen et al. | |
| 6,256,670 B1 | 7/2001 | Davies | |
| 6,330,546 B1 | 12/2001 | Gopinathan et al. | |
| 6,422,462 B1 | 7/2002 | Cohen | |
| 6,516,056 B1 | 2/2003 | Justice et al. | |
| 6,651,168 B1 | 11/2003 | Kao et al. | |
| 6,658,393 B1 | 12/2003 | Basch et al. | |
| 6,718,328 B1 | 4/2004 | Norris | |
| 6,748,367 B1 | 6/2004 | Lee | |
| 7,058,806 B2 | 6/2006 | Smeets et al. | |
| 7,111,323 B1 | 9/2006 | Bhatia et al. | |
| 7,136,835 B1 | 11/2006 | Flitcroft et al. | |
| 7,177,838 B1 | 2/2007 | Ling | |
| 7,231,202 B2 | 6/2007 | Natsuno | |
| 7,239,226 B2 | 7/2007 | Berardi et al. | |
| 7,328,189 B2 | 2/2008 | Ling | |
| 7,337,144 B1 | 2/2008 | Blinn et al. | |
| 7,373,515 B2 | 5/2008 | Owen et al. | |
| 7,398,250 B2 | 7/2008 | Blinn et al. | |
| 7,472,081 B1 | 12/2008 | Cason | |
| 7,529,741 B2 | 5/2009 | Aravamudan et al. | |
| 7,546,276 B2 | 6/2009 | Randle et al. | |
| 7,596,530 B1 | 9/2009 | Glasberg | |
| 7,599,287 B2 | 10/2009 | Testa et al. | |
| 7,606,560 B2 | 10/2009 | Labrou et al. | |
| 7,610,040 B2 | 10/2009 | Cantini et al. | |
| 7,627,505 B2 | 12/2009 | Yoshida et al. | |
| 7,657,489 B2 | 2/2010 | Stambaugh | |
| 7,693,771 B1 | 4/2010 | Zimmerman et al. | |
| 7,697,920 B1 | 4/2010 | McClain | |
| 7,698,221 B2 | 4/2010 | Blinn et al. | |
| 7,698,443 B2 | 4/2010 | Yaffe et al. | |
| 7,716,180 B2 | 5/2010 | Vermeulen et al. | |
| 7,738,382 B2 | 6/2010 | Le Faucheur et al. | |
| 7,739,169 B2 | 6/2010 | Hammad | |
| 7,742,967 B1 | 6/2010 | Keresman, III et al. | |
| 7,783,281 B1 | 8/2010 | Cook et al. | |
| 7,784,684 B2 | 8/2010 | Labrou et al. | |
| 7,848,980 B2 | 12/2010 | Carlson | |
| 7,930,264 B2 | 4/2011 | Geppert | |
| 7,988,045 B2 | 8/2011 | Connell, II et al. | |
| 7,992,779 B2 | 8/2011 | Phillips et al. | |
| 8,012,219 B2 | 9/2011 | Mendez et al. | |
| 8,032,932 B2 | 10/2011 | Speyer et al. | |
| 8,156,335 B2 | 4/2012 | Lin | |
| 8,165,945 B2 | 4/2012 | Collins et al. | |
| 8,171,531 B2 | 5/2012 | Buer | |
| 8,201,232 B2 | 6/2012 | Zhang et al. | |
| 8,214,650 B2 | 7/2012 | Dickinson et al. | |
| 8,244,210 B2 | 8/2012 | Ayanamcottil et al. | |
| 8,249,805 B2 | 8/2012 | de Silva et al. | |
| 8,261,093 B1 | 9/2012 | Dhesi et al. | |
| 8,270,995 B1 | 9/2012 | Manroa et al. | |
| 8,286,227 B1 | 10/2012 | Zheng | |
| 8,295,812 B1 | 10/2012 | Jones | |
| 8,295,898 B2 | 10/2012 | Ashfield et al. | |
| 8,307,412 B2 | 11/2012 | Ozzie et al. | |
| 8,307,413 B2 | 11/2012 | Smadja et al. | |
| 8,327,428 B2 | 12/2012 | Bailey et al. | |
| 8,327,429 B2 | 12/2012 | Speyer et al. | |
| 8,332,272 B2 | 12/2012 | Fisher | |
| 8,340,981 B1 | 12/2012 | Cave | |
| 8,346,666 B2 | 1/2013 | Lindelsee et al. | |
| 8,352,323 B2 | 1/2013 | Fisher | |
| 8,352,730 B2 | 1/2013 | Giobbi | |
| 8,369,833 B2 | 2/2013 | McClain | |
| 8,380,177 B2 | 2/2013 | Laracey | |
| 8,395,242 B2 | 3/2013 | Oliver et al. | |
| 8,407,142 B1 | 3/2013 | Griggs | |
| 8,412,626 B2 | 4/2013 | Hirson et al. | |
| 8,423,466 B2 | 4/2013 | Lanc | |
| 8,426,884 B2 | 4/2013 | Mizutani et al. | |
| 8,442,915 B2 | 5/2013 | Takatori et al. | |
| 8,483,194 B1 | 7/2013 | Wu et al. | |
| 8,483,663 B1 | 7/2013 | Jones | |
| 8,485,438 B2 | 7/2013 | Dollard | |
| 8,498,940 B2 | 7/2013 | Pelegero et al. | |
| 8,522,039 B2 | 8/2013 | Hyndman et al. | |
| 8,572,689 B2 | 10/2013 | Radhakrishnan | |
| 8,577,804 B1 | 11/2013 | Bacastow | |
| 8,583,498 B2 | 11/2013 | Fried et al. | |
| 8,584,251 B2 | 11/2013 | McGuire et al. | |
| 8,589,271 B2 | 11/2013 | Evans | |
| 8,590,008 B1 | 11/2013 | Ellmore | |
| 8,595,812 B2 | 11/2013 | Bomar et al. | |
| 8,601,602 B1 | 12/2013 | Zheng | |
| 8,602,602 B2 | 12/2013 | Anaokar et al. | |
| 8,620,790 B2 | 12/2013 | Priebatsch | |
| 8,637,133 B2 | 1/2014 | Vagliardo | |
| 8,644,506 B2 | 2/2014 | Zellner | |
| 8,650,757 B2 | 2/2014 | Rode | |
| 8,660,358 B1 | 2/2014 | Bergboer et al. | |
| 8,665,991 B2 | 3/2014 | Zhu et al. | |
| 8,682,802 B1 | 3/2014 | Kannanari | |
| 8,683,571 B2 | 3/2014 | Zapata et al. | |
| 8,744,968 B1 | 6/2014 | Grigg et al. | |
| 8,768,838 B1 | 7/2014 | Hoffman | |
| 8,769,270 B2 | 7/2014 | Orsini et al. | |
| 8,788,333 B2 | 7/2014 | Alba et al. | |
| 8,788,429 B2 | 7/2014 | Tieken | |
| 8,789,162 B2 | 7/2014 | Radhakrishnan | |
| 8,839,383 B2 | 9/2014 | Van Horn | |
| 8,850,575 B1 | 9/2014 | Magi et al. | |
| 8,869,241 B2 | 10/2014 | Davis et al. | |
| 8,869,305 B1 | 10/2014 | Huang | |
| 8,881,306 B2 | 11/2014 | Feldman et al. | |
| 8,930,271 B1 | 1/2015 | Ellis et al. | |
| 8,943,574 B2 | 1/2015 | Bailey et al. | |
| 8,973,102 B2 | 3/2015 | Jakobsson | |
| 8,985,442 B1 | 3/2015 | Zhou et al. | |
| 8,996,423 B2 | 3/2015 | Johnson et al. | |
| 9,055,053 B2 | 6/2015 | Radhakrishnan et al. | |
| 9,069,943 B2 | 6/2015 | Radhakrishnan et al. | |
| 9,131,443 B2 | 9/2015 | Takaki | |
| 9,146,345 B1 | 9/2015 | Dong et al. | |
| 9,185,101 B2 | 11/2015 | Grigg et al. | |
| 9,185,117 B2 | 11/2015 | Grigg et al. | |
| 9,196,188 B2 | 11/2015 | Kimura | |
| 9,200,154 B2 | 12/2015 | Teramoto et al. | |
| 9,208,301 B2 | 12/2015 | Grigg et al. | |

(56) References Cited

U.S. PATENT DOCUMENTS

| | | |
|---|---|---|
| 9,213,814 B2 | 12/2015 | Grigg et al. |
| 9,213,974 B2 | 12/2015 | Votaw et al. |
| 9,223,951 B2 | 12/2015 | Grigg et al. |
| 9,238,674 B2 | 1/2016 | Manoj et al. |
| 9,275,278 B2 | 3/2016 | Liu et al. |
| 9,286,450 B2 | 3/2016 | Grigg et al. |
| 9,305,149 B2 | 4/2016 | Grigg et al. |
| 9,313,190 B2 | 4/2016 | Grigg et al. |
| 9,317,673 B2 | 4/2016 | Grigg et al. |
| 9,317,674 B2 | 4/2016 | Grigg et al. |
| 9,331,994 B2 | 5/2016 | Grigg et al. |
| 9,379,586 B2 | 6/2016 | Rahman et al. |
| 9,390,242 B2 | 7/2016 | Grigg et al. |
| 9,400,005 B2 | 7/2016 | Osborn et al. |
| 2001/0049711 A1 | 12/2001 | Nishihara |
| 2002/0077978 A1 | 6/2002 | O'Leary et al. |
| 2002/0111907 A1 | 8/2002 | Ling |
| 2002/0157029 A1 | 10/2002 | French et al. |
| 2002/0174073 A1 | 11/2002 | Nordman et al. |
| 2002/0186845 A1 | 12/2002 | Dutta et al. |
| 2003/0004866 A1 | 1/2003 | Huennekens et al. |
| 2003/0045328 A1 | 3/2003 | Natsuno |
| 2003/0061170 A1 | 3/2003 | Uzo |
| 2003/0065805 A1 | 4/2003 | Barnes, Jr. |
| 2003/0105714 A1 | 6/2003 | Alarcon-Luther et al. |
| 2003/0163708 A1 | 8/2003 | Tang |
| 2003/0163787 A1 | 8/2003 | Hay et al. |
| 2005/0119978 A1 | 6/2005 | Ates |
| 2005/0222961 A1 | 10/2005 | Staib et al. |
| 2006/0030333 A1 | 2/2006 | Ward et al. |
| 2006/0036868 A1 | 2/2006 | Cicchitto |
| 2006/0287004 A1 | 12/2006 | Fuqua |
| 2007/0055594 A1 | 3/2007 | Rivest et al. |
| 2007/0094152 A1 | 4/2007 | Bauman et al. |
| 2007/0100773 A1 | 5/2007 | Wallach |
| 2007/0113275 A1 | 5/2007 | Khanna et al. |
| 2007/0156842 A1 | 7/2007 | Vermeulen et al. |
| 2007/0168677 A1 | 7/2007 | Kudo et al. |
| 2007/0194884 A1 | 8/2007 | Didier et al. |
| 2007/0219984 A1 | 9/2007 | Aravamudan et al. |
| 2007/0223706 A1 | 9/2007 | Gantman et al. |
| 2007/0250920 A1 | 10/2007 | Lindsay |
| 2007/0277232 A1 | 11/2007 | Cates et al. |
| 2008/0109319 A1 | 5/2008 | Foss |
| 2008/0162338 A1 | 7/2008 | Samuels et al. |
| 2008/0162589 A1 | 7/2008 | Rodeheffer et al. |
| 2008/0167965 A1 | 7/2008 | Von Nothaus et al. |
| 2008/0189210 A1 | 8/2008 | Sawhney |
| 2008/0195499 A1 | 8/2008 | Meredith et al. |
| 2008/0293397 A1 | 11/2008 | Gajdos et al. |
| 2008/0319889 A1 | 12/2008 | Hammad |
| 2009/0006230 A1 | 1/2009 | Lyda et al. |
| 2009/0019534 A1 | 1/2009 | Bakshi et al. |
| 2009/0057396 A1 | 3/2009 | Barbour et al. |
| 2009/0076965 A1 | 3/2009 | Elson et al. |
| 2009/0100529 A1 | 4/2009 | Livnat et al. |
| 2009/0117883 A1 | 5/2009 | Coffing et al. |
| 2009/0119190 A1 | 5/2009 | Realini |
| 2009/0150286 A1 | 6/2009 | Barton |
| 2009/0164327 A1 | 6/2009 | Bishop et al. |
| 2009/0187492 A1 | 7/2009 | Hammad et al. |
| 2009/0199264 A1 | 8/2009 | Lang |
| 2009/0217346 A1 | 8/2009 | Manring et al. |
| 2009/0241178 A1 | 9/2009 | Burch et al. |
| 2009/0254975 A1 | 10/2009 | Turnbull et al. |
| 2010/0036741 A1 | 2/2010 | Cleven |
| 2010/0064345 A1 | 3/2010 | Bentley et al. |
| 2010/0100897 A1 | 4/2010 | Manuel-Devadoss |
| 2010/0122333 A1 | 5/2010 | Noe |
| 2010/0241571 A1 | 9/2010 | Mcdonald |
| 2010/0257099 A1 | 10/2010 | Bonalle et al. |
| 2010/0268645 A1 | 10/2010 | Martino et al. |
| 2010/0299262 A1 | 11/2010 | Handler |
| 2010/0312636 A1 | 12/2010 | Coulter et al. |
| 2010/0330958 A1 | 12/2010 | Corda et al. |
| 2011/0016534 A1 | 1/2011 | Jakobsson et al. |
| 2011/0022483 A1 | 1/2011 | Hammad |
| 2011/0099104 A1 | 4/2011 | Nybom |
| 2011/0137804 A1 | 6/2011 | Peterson |
| 2011/0142234 A1 | 6/2011 | Rogers |
| 2011/0159846 A1 | 6/2011 | Kemshall |
| 2011/0166992 A1 | 7/2011 | Dessert et al. |
| 2011/0167440 A1 | 7/2011 | Greenfield |
| 2011/0208601 A1 | 8/2011 | Ferguson et al. |
| 2011/0218907 A1 | 9/2011 | Dessert et al. |
| 2011/0251892 A1 | 10/2011 | Laracey |
| 2011/0270618 A1 | 11/2011 | Banerjee et al. |
| 2011/0277016 A1 | 11/2011 | Hockings et al. |
| 2011/0294066 A1 | 12/2011 | Hasegawa |
| 2011/0320296 A1 | 12/2011 | Edwards |
| 2012/0030047 A1 | 2/2012 | Fuentes et al. |
| 2012/0030109 A1 | 2/2012 | Dooley Maley et al. |
| 2012/0054057 A1 | 3/2012 | O'Connell et al. |
| 2012/0089514 A1 | 4/2012 | Kraemling et al. |
| 2012/0095916 A1 | 4/2012 | Dorsey et al. |
| 2012/0120880 A1 | 5/2012 | Lee et al. |
| 2012/0131828 A1 | 5/2012 | August et al. |
| 2012/0137340 A1 | 5/2012 | Jakobsson et al. |
| 2012/0144461 A1 | 6/2012 | Rathbun |
| 2012/0144468 A1 | 6/2012 | Pratt et al. |
| 2012/0158540 A1 | 6/2012 | Ganti et al. |
| 2012/0158586 A1 | 6/2012 | Ganti et al. |
| 2012/0160912 A1 | 6/2012 | Laracey |
| 2012/0166334 A1 | 6/2012 | Kimberg et al. |
| 2012/0171237 A1 | 7/2012 | Ching et al. |
| 2012/0173551 A1 | 7/2012 | Haddorp et al. |
| 2012/0174237 A1 | 7/2012 | Krzyzanowski |
| 2012/0179558 A1 | 7/2012 | Fischer |
| 2012/0197743 A1 | 8/2012 | Grigg et al. |
| 2012/0197794 A1 | 8/2012 | Grigg et al. |
| 2012/0203700 A1 | 8/2012 | Ornce et al. |
| 2012/0230539 A1 | 9/2012 | Calman et al. |
| 2012/0239576 A1 | 9/2012 | Rose et al. |
| 2012/0252365 A1 | 10/2012 | Lam |
| 2012/0254941 A1 | 10/2012 | Levien et al. |
| 2012/0254943 A1 | 10/2012 | Li |
| 2012/0260318 A1 | 10/2012 | Fromentoux et al. |
| 2012/0265585 A1 | 10/2012 | Muirbrook et al. |
| 2012/0271712 A1 | 10/2012 | Katzin et al. |
| 2012/0290482 A1 | 11/2012 | Atef et al. |
| 2012/0300938 A1 | 11/2012 | Kean et al. |
| 2012/0316963 A1 | 12/2012 | Moshfeghi |
| 2012/0316992 A1 | 12/2012 | Oborne |
| 2012/0317034 A1 | 12/2012 | Guha et al. |
| 2012/0323783 A1 | 12/2012 | Canetto |
| 2012/0330846 A1 | 12/2012 | Light et al. |
| 2013/0007874 A1 | 1/2013 | Purvis |
| 2013/0009547 A1 | 1/2013 | Shiu et al. |
| 2013/0013498 A1 | 1/2013 | Fisher et al. |
| 2013/0013499 A1 | 1/2013 | Kalgi |
| 2013/0018738 A1 | 1/2013 | Faires et al. |
| 2013/0024360 A1 | 1/2013 | Ballout |
| 2013/0030882 A1 | 1/2013 | Davis, III et al. |
| 2013/0030931 A1 | 1/2013 | Moshfeghi |
| 2013/0031003 A1 | 1/2013 | Dorsey et al. |
| 2013/0031004 A1 | 1/2013 | Dorsey et al. |
| 2013/0036048 A1 | 2/2013 | Campos et al. |
| 2013/0042314 A1 | 2/2013 | Kelley |
| 2013/0054336 A1 | 2/2013 | Graylin |
| 2013/0054470 A1 | 2/2013 | Campos et al. |
| 2013/0060689 A1 | 3/2013 | Oskolkov et al. |
| 2013/0060708 A1 | 3/2013 | Oskolkov et al. |
| 2013/0085927 A1 | 4/2013 | Scott |
| 2013/0097682 A1 | 4/2013 | Zeljkovic et al. |
| 2013/0097683 A1 | 4/2013 | Davis et al. |
| 2013/0097684 A1 | 4/2013 | Kim |
| 2013/0102283 A1 | 4/2013 | Lau et al. |
| 2013/0110658 A1 | 5/2013 | Lyman et al. |
| 2013/0111208 A1 | 5/2013 | Sabin et al. |
| 2013/0124346 A1 | 5/2013 | Baldwin et al. |
| 2013/0138627 A1 | 5/2013 | Zaydman et al. |
| 2013/0143621 A1 | 6/2013 | Kumaran |
| 2013/0159178 A1 | 6/2013 | Colon et al. |
| 2013/0166332 A1 | 6/2013 | Hammad |

(56) References Cited

U.S. PATENT DOCUMENTS

| | | |
|---|---|---|
| 2013/0167207 A1 | 6/2013 | Davis et al. |
| 2013/0173456 A1 | 7/2013 | Grigg et al. |
| 2013/0178233 A1 | 7/2013 | McCoy et al. |
| 2013/0179341 A1 | 7/2013 | Boudreau |
| 2013/0179954 A1 | 7/2013 | Bidare |
| 2013/0188485 A1 | 7/2013 | Midani et al. |
| 2013/0191227 A1 | 7/2013 | Pasa et al. |
| 2013/0198056 A1 | 8/2013 | Aldrey et al. |
| 2013/0204775 A1 | 8/2013 | Midkiff et al. |
| 2013/0204787 A1 | 8/2013 | Dubois |
| 2013/0212007 A1 | 8/2013 | Mattsson et al. |
| 2013/0212019 A1 | 8/2013 | Mattsson et al. |
| 2013/0219454 A1 | 8/2013 | Hewinson |
| 2013/0219473 A1 | 8/2013 | Schaefer |
| 2013/0246258 A1 | 9/2013 | Dessert |
| 2013/0246260 A1 | 9/2013 | Barten et al. |
| 2013/0254052 A1 | 9/2013 | Royyuru et al. |
| 2013/0254115 A1 | 9/2013 | Pasa et al. |
| 2013/0262315 A1 | 10/2013 | Hruska |
| 2013/0267204 A1 | 10/2013 | Schultz et al. |
| 2013/0268437 A1 | 10/2013 | Desai et al. |
| 2013/0290361 A1 | 10/2013 | Anderson et al. |
| 2013/0304651 A1 | 11/2013 | Smith |
| 2013/0318627 A1 | 11/2013 | Lundkvist et al. |
| 2013/0346302 A1 | 12/2013 | Purves et al. |
| 2014/0006273 A1 | 1/2014 | Gopinath et al. |
| 2014/0012647 A1 | 1/2014 | Hecht |
| 2014/0025581 A1 | 1/2014 | Calman |
| 2014/0025958 A1 | 1/2014 | Calman |
| 2014/0058938 A1 | 2/2014 | McClung, III |
| 2014/0129357 A1 | 5/2014 | Goodwin |
| 2014/0130127 A1 | 5/2014 | Toole et al. |
| 2014/0143145 A1 | 5/2014 | Kortina et al. |
| 2014/0172707 A1 | 6/2014 | Kuntagod et al. |
| 2014/0173704 A1 | 6/2014 | Adams et al. |
| 2014/0187148 A1 | 7/2014 | Taite et al. |
| 2014/0188719 A1 | 7/2014 | Poornachandran et al. |
| 2014/0195425 A1 | 7/2014 | Campos et al. |
| 2014/0208401 A1 | 7/2014 | Balakrishnan et al. |
| 2014/0214640 A1 | 7/2014 | Mallikarjunan et al. |
| 2014/0244493 A1 | 8/2014 | Kenyon et al. |
| 2014/0244503 A1 | 8/2014 | Sadlier |
| 2014/0245391 A1 | 8/2014 | Adenuga |
| 2014/0250009 A1 | 9/2014 | Carlson |
| 2014/0279270 A1 | 9/2014 | Bertanzetti et al. |
| 2014/0279476 A1 | 9/2014 | Hua |
| 2014/0279554 A1 | 9/2014 | Priebatsch et al. |
| 2014/0279566 A1 | 9/2014 | Verma et al. |
| 2014/0289821 A1 | 9/2014 | Wilson |
| 2014/0310764 A1 | 10/2014 | Tippett et al. |
| 2014/0315159 A1 | 10/2014 | Mukherjee et al. |
| 2014/0324690 A1 | 10/2014 | Allen et al. |
| 2014/0330721 A1 | 11/2014 | Wang |
| 2014/0337175 A1 | 11/2014 | Katzin et al. |
| 2014/0359709 A1 | 12/2014 | Nassar et al. |
| 2015/0019317 A1 | 1/2015 | Mitchell |
| 2015/0019439 A1 | 1/2015 | Phillips |
| 2015/0032621 A1 | 1/2015 | Kar et al. |
| 2015/0032627 A1 | 1/2015 | Dill et al. |
| 2015/0039601 A1 | 2/2015 | Harrang et al. |
| 2015/0081557 A1 | 3/2015 | Kinfoil et al. |
| 2015/0081567 A1 | 3/2015 | Boyle et al. |
| 2015/0100495 A1 | 4/2015 | Salama et al. |
| 2015/0100788 A1 | 4/2015 | Chastain et al. |
| 2015/0120569 A1 | 4/2015 | Belshe et al. |
| 2015/0120572 A1 | 4/2015 | Slade |
| 2015/0161610 A1 | 6/2015 | Sahadevan et al. |
| 2015/0170149 A1* | 6/2015 | Sharma .............. G06Q 20/3224 705/44 |
| 2015/0171049 A1 | 6/2015 | Wasserman et al. |
| 2015/0206131 A1 | 7/2015 | Phillips et al. |
| 2015/0206137 A1 | 7/2015 | Mazarim |
| 2015/0213474 A1 | 7/2015 | Howe |
| 2015/0220914 A1 | 8/2015 | Purves et al. |
| 2015/0227903 A1 | 8/2015 | Votaw et al. |
| 2015/0227924 A1 | 8/2015 | Grigg et al. |
| 2015/0227926 A1 | 8/2015 | Grigg et al. |
| 2015/0229625 A1 | 8/2015 | Grigg et al. |
| 2015/0254648 A1 | 9/2015 | Clements et al. |
| 2015/0254653 A1 | 9/2015 | Bondesen et al. |
| 2015/0254664 A1 | 9/2015 | Bondesen et al. |

OTHER PUBLICATIONS

Tode, Chantal. "Walmart speeds up checkout, lets shoppers scan items via iPhone." Published Sep. 5, 2012. http://www.mobilecommercedaily.com/walmart-speeds-up-checkout-lets-shoppers-scan-items-themselves-via-iphone.Mobile Commerce Daily. 4 pages. Retrieved Mar. 22, 2013.

Zimmerman, Ann. "Check Out the Future of Shopping: Shaving Time Off the Weekly Grocery Run to Keep Consumers in Stores and Spending." http://online.wsj.com/article/SB10001424052748703421204576329253050637400.html. 5 pages. Retrieved Mar. 22, 2013.

RISNews.edgl.com. "Supermarket Retailer Rolls Out Self-Checkout Smartphone App." http://risnews.edgl.com/retail-news/Super-market-Retailer-Rolls-Out-Self-Checkout-Smartphone-App81027 2 pages. Retrieved Mar. 9, 2013.

Office Action dated Aug. 27, 2015 for U.S Appl. No. 14/175,701.

Simon, "Credit-Card Reward Programs: A Short History"; Credi; Creditcards.com, Nov. 2006, 4 pages.

Lane, "History of APIs"; APIE; APIEvangelist.com; Dec. 2012, 11 pages.

* cited by examiner

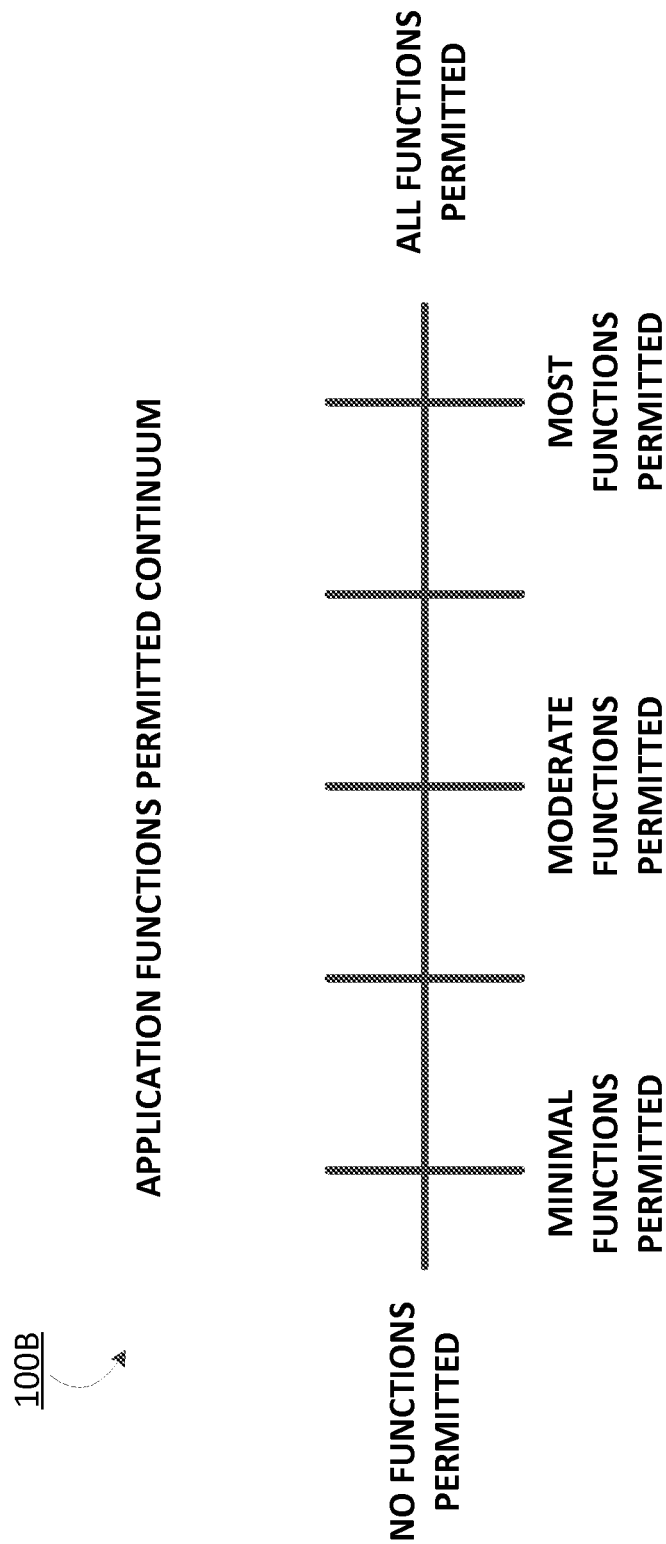

SELF-SELECTED USER ACCESS BASED ON SPECIFIC AUTHENTICATION TYPES

CROSS-REFERENCE TO RELATED APPLICATIONS

This application is a continuation of U.S. patent application Ser. No. 14/175,672, filed Feb. 7, 2014; the contents of which are hereby incorporated by reference.

BACKGROUND

Systems and methods for effective authentication have been in great demand to prevent fraud and theft of services. The increase in mobile technology has resulted in a need for accurate identification of users for the purposes of electronic services such as banking services, credit card services, automatic teller machine (ATM) services, account information services such as mortgage, savings, and investment accounts. However, conventional authentication systems typically require a multi-step authentication to enable user access to a financial application for the purposes of checking balance, transferring funds, bill pay, or the like. Such multi-step authentication, although more effective at preventing misrepresentation, may d displease the user, especially if the user accesses banking services frequently. There is a need for personalizing the authentication process.

BRIEF SUMMARY

According to embodiments of the invention, a system for authenticating a user using self-selected preferences is presented, the system comprising: a processor; a memory; a module stored in memory executable by a processor, and configured to cause the processor to receive from a user, a request to execute a user action associated with an application, wherein execution of the user action requires validation of one or more authentication credentials; access a user-selected preference, wherein the user-selected preference comprises a level of authentication desired by the user; determine which one or more authentication types from a plurality of authentication types are associated with the level of authentication associated with the user-selected preference; request one or more authentication credentials corresponding to the determined one or more authentication types; receive one or more authentication credentials from the user; validate the one or more authentication credentials, thereby resulting in a successful validation of the one or more authentication credentials; and in response to the successful validation of the one or more authentication credentials, execute the user action.

In some embodiments, the one or more authentication credentials received from the user and one or more functions associated with the application permitted for user access are positively correlated.

In some embodiments, the user-selected preference comprises a time duration, wherein the time duration is defined by a user selection of a first time stamp and a second time stamp, wherein the first time stamp and the second time stamp define the boundaries of application of the level of authentication.

In some embodiments, the user-selected preference comprises a geographic location, wherein the geographic location is a point within a geographic radius, wherein the geographic radius defines the boundary of application of the level of authentication.

In some embodiments, validating further comprises determining a successful match between the one or more authentication credentials received from the user and the one or more authentication credentials stored in a database, wherein the one or more authentication credentials correspond to the one or more authentication types associated with the level of authentication.

In some embodiments, the one or more authentication levels are associated with at least one of a hard authentication, a soft authentication, and a zero authentication.

In some embodiments, hard authentication comprises enabling a user to access all functions associated with the application based on at least a successful validation of the one or more authentication credentials associated with the user.

In some embodiments, the hard authentication comprises a multi-step verification of at least two authentication types, wherein verification further comprises receiving a user input of at least two authentication credentials.

In some embodiments, the authentication type associated with the multi-step verification is at least one of a username, a password, a personal identification number, or a biometric indicia.

In some embodiments, soft authentication comprises enabling a user to access one or more functions associated with the application based on at least a successful validation of the one or more authentication credentials associated with the user.

In some embodiments, the soft authentication comprises a secondary verification of at least one authentication type, wherein verification further comprises receiving a user input of at least one authentication credential.

In some embodiments, the at least one authentication type associated with the secondary verification comprises at least one of a social media authentication, an internet protocol (IP) based authentication, a fob, or a signed digital certificate.

In some embodiments, the zero authentication comprises restricting the user from access to the application after a predetermined number of authentication attempts to access the application.

In some embodiments, the module is configured to place a provisional flag on the application after exhaustion of a predetermined number of authentication attempts to access the application, wherein placing a provisional flag comprises notifying the user using a secondary means for contact.

In some embodiments, receiving one or more authentication credentials comprises receiving an input from the user.

In some embodiments, the application is associated with a financial institution.

In some embodiments, the user-selected preference is customizable.

In some embodiments, the user action comprises at least one of a funds transfer, viewing an account summary, a deposit, a withdrawal, or viewing a receipt.

In one aspect, the present invention is directed to a method for user authentication based on self-selected preferences, the method comprising: receiving, using a computing device processor, from a user, a request to execute a user action associated with an application, wherein execution of the user action requires validation of one or more authentication credentials; accessing, using a computing device processor, a user-selected preference, wherein the user-selected preference comprises a level of authentication desired by the user; determining, using a computing device processor, which one or more authentication types from a plurality of authentication types are associated with the level of authentication associated with the user-selected preference; requesting, using a computing device processor, one or more authentication credentials corresponding to the determined one or more authentication types; receiving, using a computing device processor, one or more authentication credentials from the user; validating, using a computing device processor, the one or more authentication credentials, thereby resulting in a successful validation of the one or more authentication credentials; and in response to the successful validation of the one or more authentication credentials, executing, using a computing device processor, the user action.

In one aspect, the present invention is directed to a computer program product for user authentication based on self-selected preferences, the computer program product comprising a non-transitory computer-readable medium comprising code causing a first apparatus to: receive from a user, a request to execute a user action associated with an application, wherein execution of the user action requires validation of one or more authentication credentials; access a user-selected preference, wherein the user-selected preference comprises a level of authentication desired by the user; determine which one or more authentication types from a plurality of authentication types are associated with the level of authentication associated with the user-selected preference; request one or more authentication credentials corresponding to the determined one or more authentication types; receive one or more authentication credentials from the user; validate the one or more authentication credentials, thereby resulting in a successful validation of the one or more authentication credentials; and in response to the successful validation of the one or more authentication credentials, execute the user action.

In one aspect, the present invention is directed to a system for self-selected user access based on specific authentication types, the system comprising: a processor; a memory; a module stored in memory executable by a processor, and configured to cause the processor to: receive from a user, a user-selected preference, wherein the user-selected preference comprises one or more authentication types desired by the user; determine a level of authentication from a plurality of levels of authentication are associated with the one or more authentication types associated with the user-selected preference; initiate the presentation of a user interface that enables the user to select one or more application functions, wherein the one or more application functions are associated with the determined level of authentication; receive from a user, a selection of one or more application functions, wherein receiving the selection further comprises receiving a request to execute the selected one or more application functions, wherein execution of the user action requires validation of one or more authentication credentials; request one or more authentication credentials corresponding to the desired one or more authentication types; receive one or more authentication credentials from the user; validate the one or more authentication credentials, thereby resulting in a successful validation of the one or more authentication credentials; and in response to the successful validation of the one or more authentication credentials, execute the selected one or more application functions.

In some embodiments, the user interface enables the user to select one or more application functions associated with the determined level of authentication corresponding to the authentication type desired.

In some embodiments, the user interface enables the user to reset the selected one or more application functions thereby removing restrictions on access to the one or more application functions.

In some embodiments, the user interface enables the user to save the selected one or more application functions for use at a future date.

In some embodiments, the user interface enables the user to acknowledge the selection of one or more application function or cancel the selection of one or more application functions.

In one aspect, the present invention is directed to a method for self-selected user access based on specific authentication types, the method comprising: receiving, using a computing device processor, from a user, a user-selected preference, wherein the user-selected preference comprises one or more authentication types desired by the user; determining, using a computing device processor, a level of authentication from a plurality of levels of authentication are associated with the one or more authentication types associated with the user-selected preference; initiating, using a computing device processor, the presentation of a user interface that enables the user to select one or more application functions, wherein the one or more application functions are associated with the determined level of authentication; receiving, using a computing device processor, from a user, a selection of one or more application functions, wherein receiving the selection further comprises receiving a request to execute the selected one or more application functions, wherein execution of the user action requires validation of one or more authentication credentials; requesting, using a computing device processor, one or more authentication credentials corresponding to the desired one or more authentication types; receiving, using a computing device processor, one or more authentication credentials from the user; validating, using a computing device processor, the one or more authentication credentials, thereby resulting in a successful validation of the one or more authentication credentials; and in response to the successful validation of the one or more authentication credentials, executing, using a computing device processor, the selected one or more application functions.

In another aspect, the present invention is directed to a computer program product for self-selected user access based on specific authentication types, the computer program product comprising a non-transitory computer-readable medium comprising code causing a first apparatus to: receive from a user, a user-selected preference, wherein the user-selected preference comprises one or more authentication types desired by the user; determine a level of authentication from a plurality of levels of authentication are associated with the one or more authentication types associated with the user-selected preference; initiate the presentation of a user interface that enables the user to select one or more application functions, wherein the one or more application functions are associated with the determined level of authentication; receive from a user, a selection of one or more application functions, wherein receiving the selection further comprises receiving a request to execute the selected one or more application functions, wherein execution of the user action requires validation of one or more authentication credentials; request one or more authentication credentials corresponding to the desired one or more authentication types; receive one or more authentication credentials from the user; validate the one or more authentication credentials, thereby resulting in a successful validation of the one or more authentication credentials; and in response to the successful validation of the one or more authentication credentials, execute the selected one or more application functions.

BRIEF DESCRIPTION OF THE FIGURES

Figure 1A:
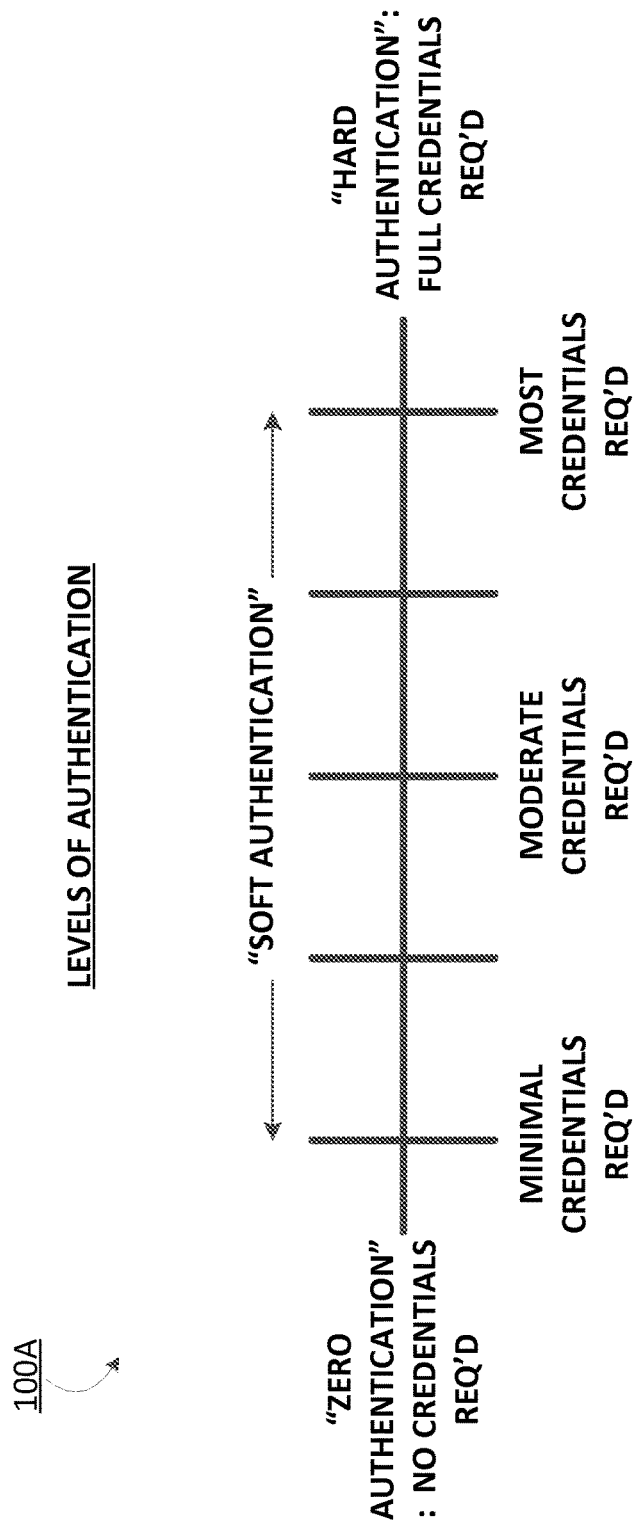

Having thus described embodiments of the invention in general terms, reference will now be made to accompanying drawings, where:

FIG. 1A presents an illustration of the authentication continuum in accordance to one embodiment of the invention.

FIG. 1B presents an illustration of the application functions permitted continuum in accordance to one embodiment of the invention.

Figure 1C:
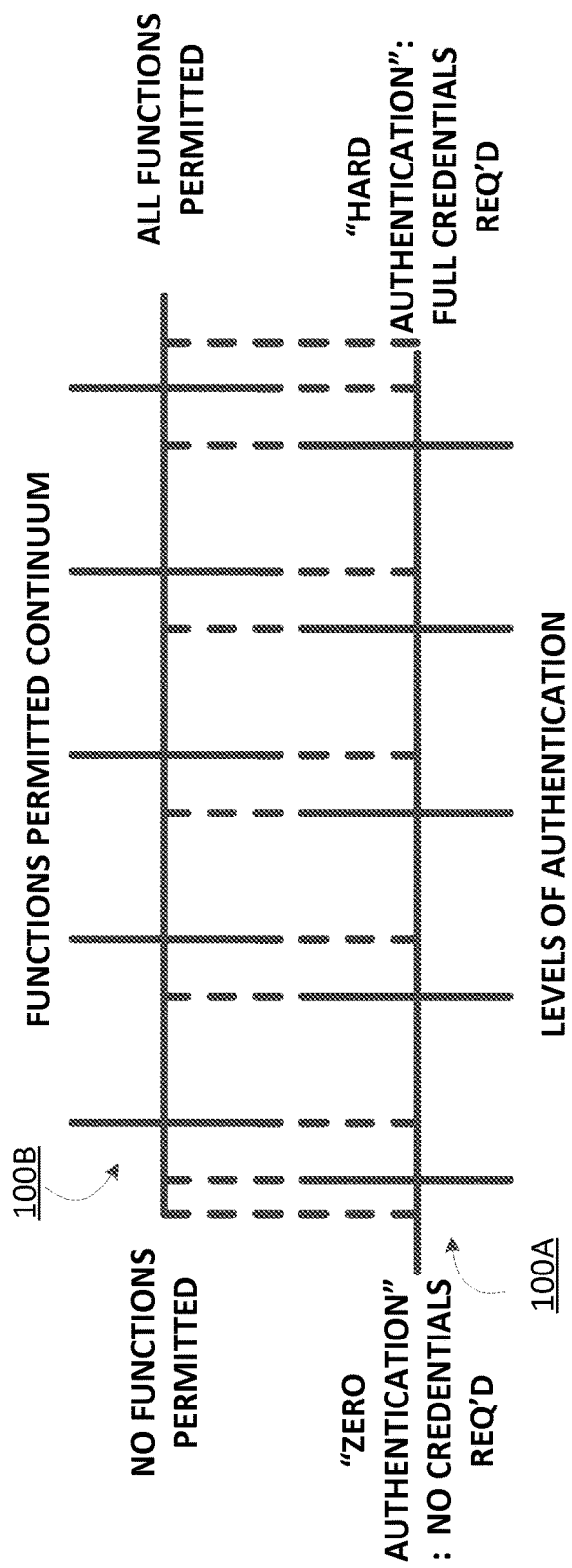

FIG. 1C presents an illustration of the coupling of the application functions permitted continuum and the levels of authentication continuum in accordance to one embodiment of the invention.

Figure 1D:
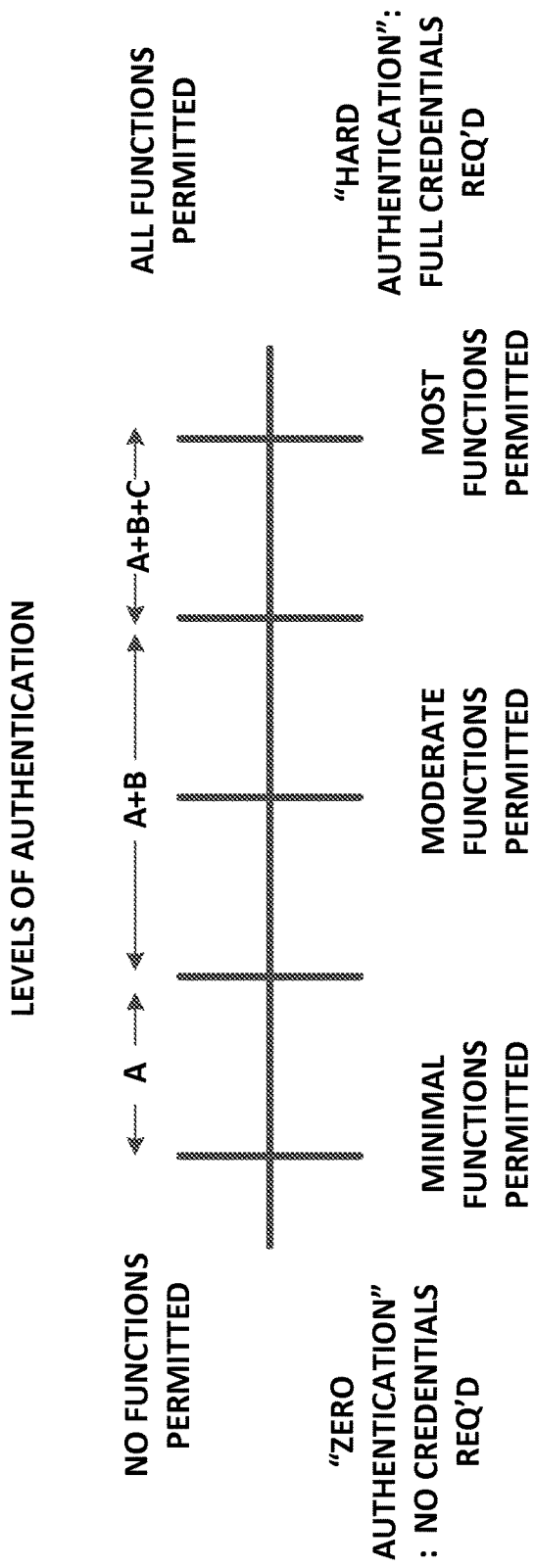

FIG. 1D presents an illustration of the relationship between the functions permitted and the authentication types in accordance to one embodiment of the invention.

Figure 2:
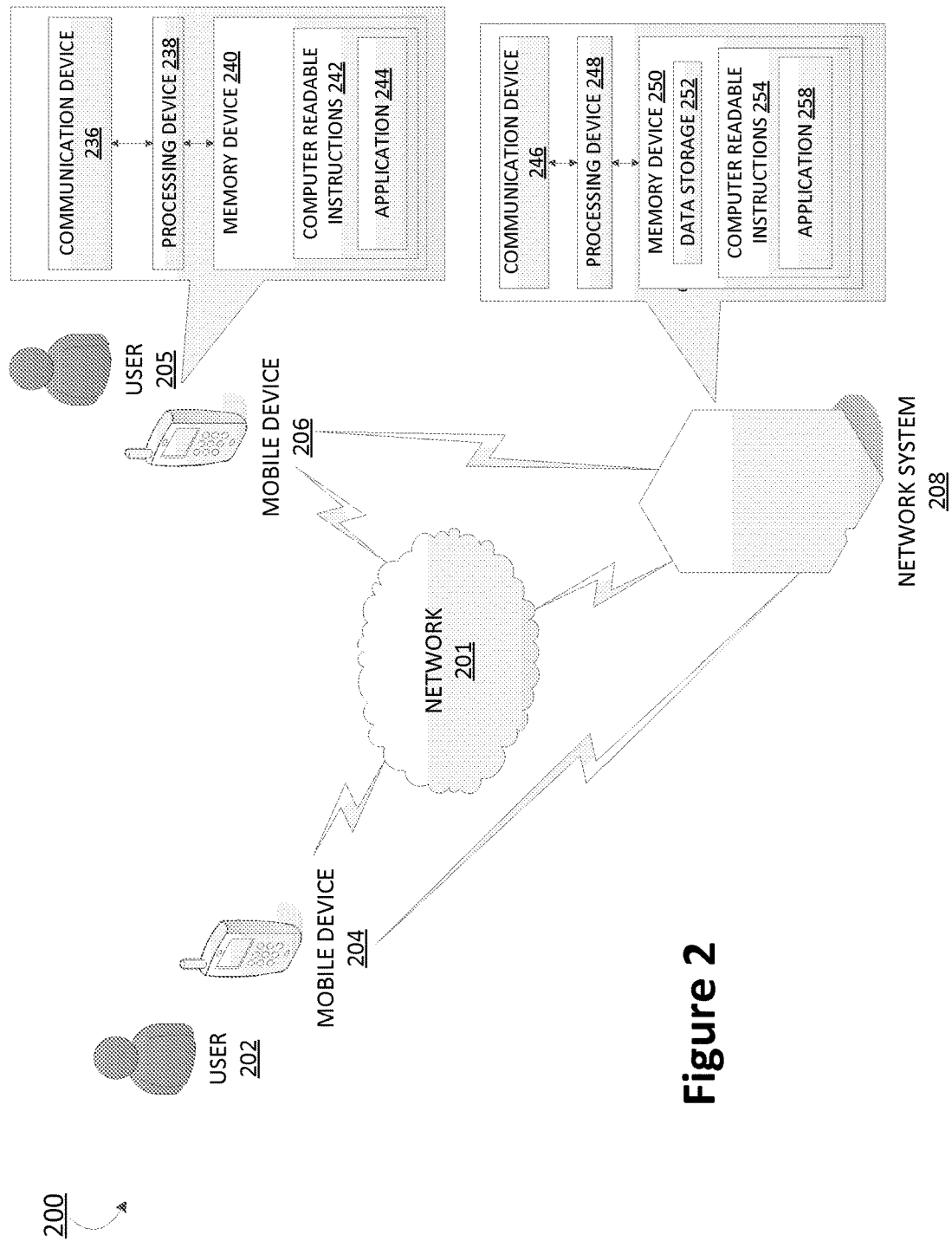

FIG. 2 presents an illustration of the network environment in accordance to one embodiment of the invention.

Figure 3:
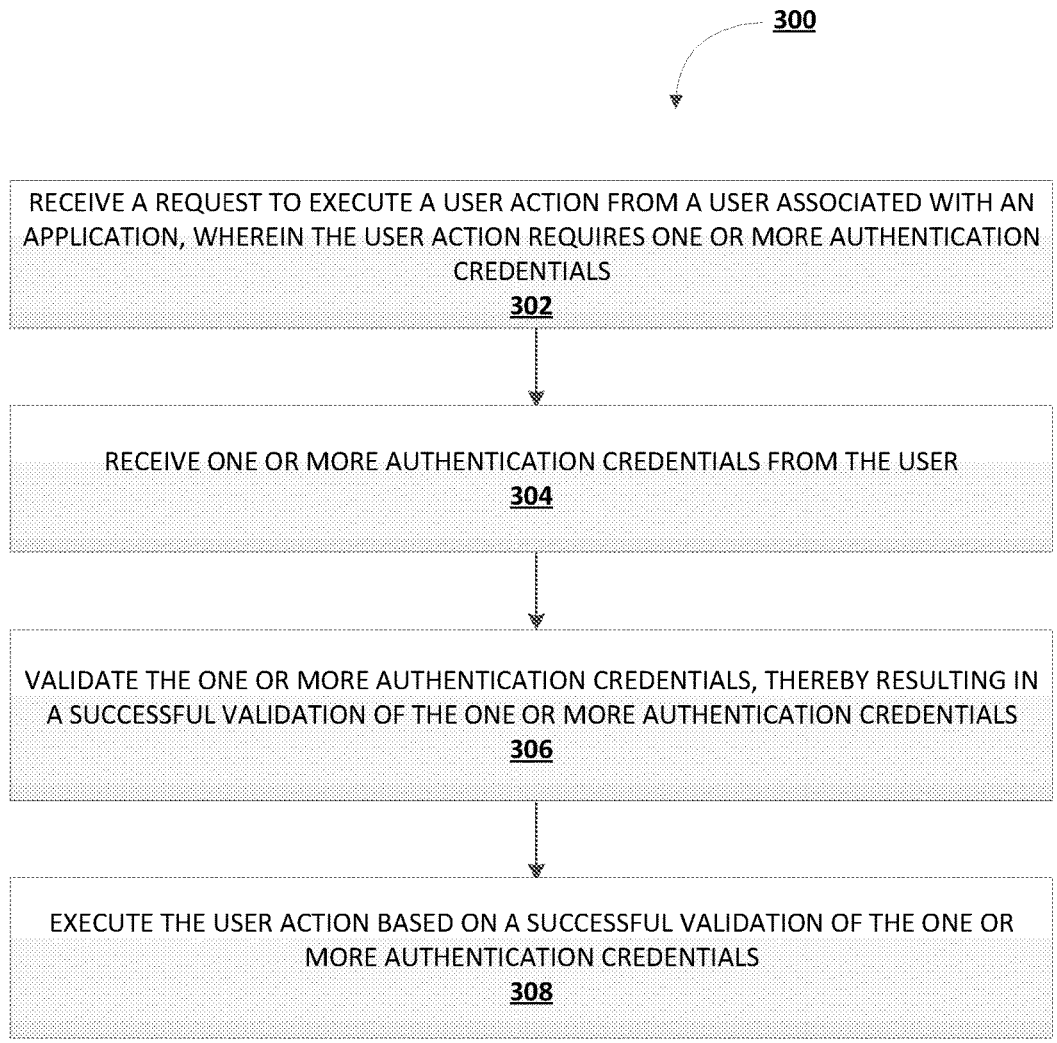

FIG. 3 illustrates a high level process flow for a user authentication based on self-selected preferences in accordance to one embodiment of the invention.

Figure 4:
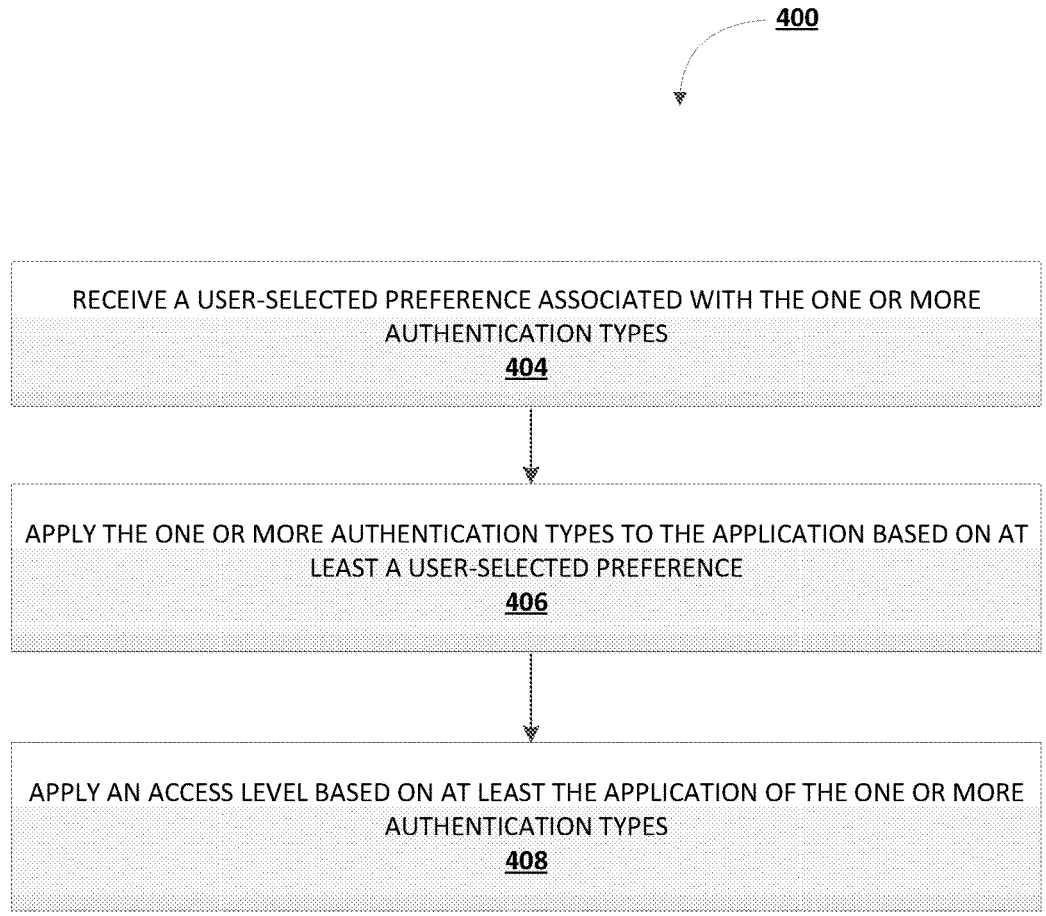

FIG. 4 illustrates a process flow for applying an access level to an application in accordance to one embodiment of the invention.

Figure 5:
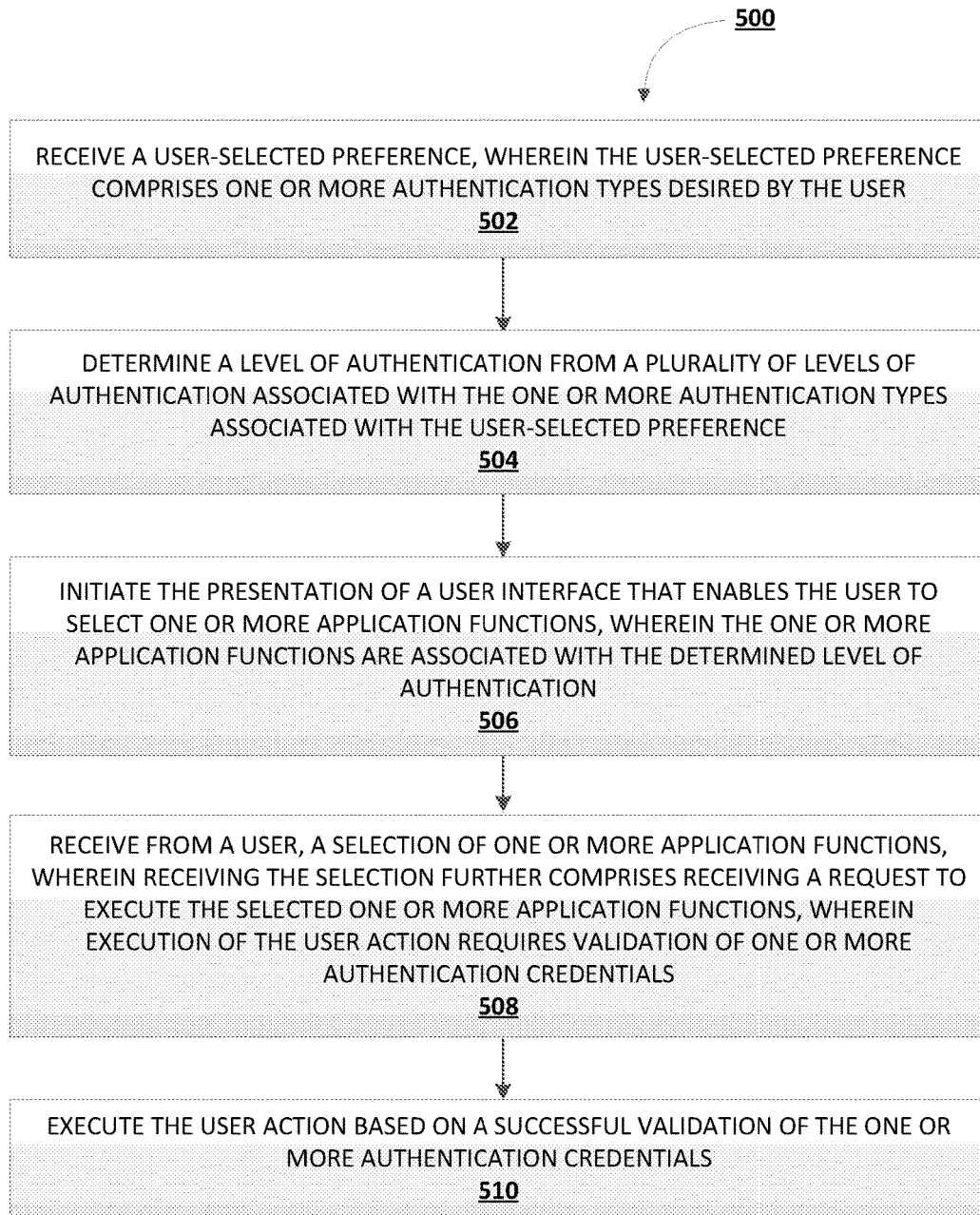

FIG. 5 illustrates a process flow for a self-selected user access based on specific authentication types.

Figure 6:
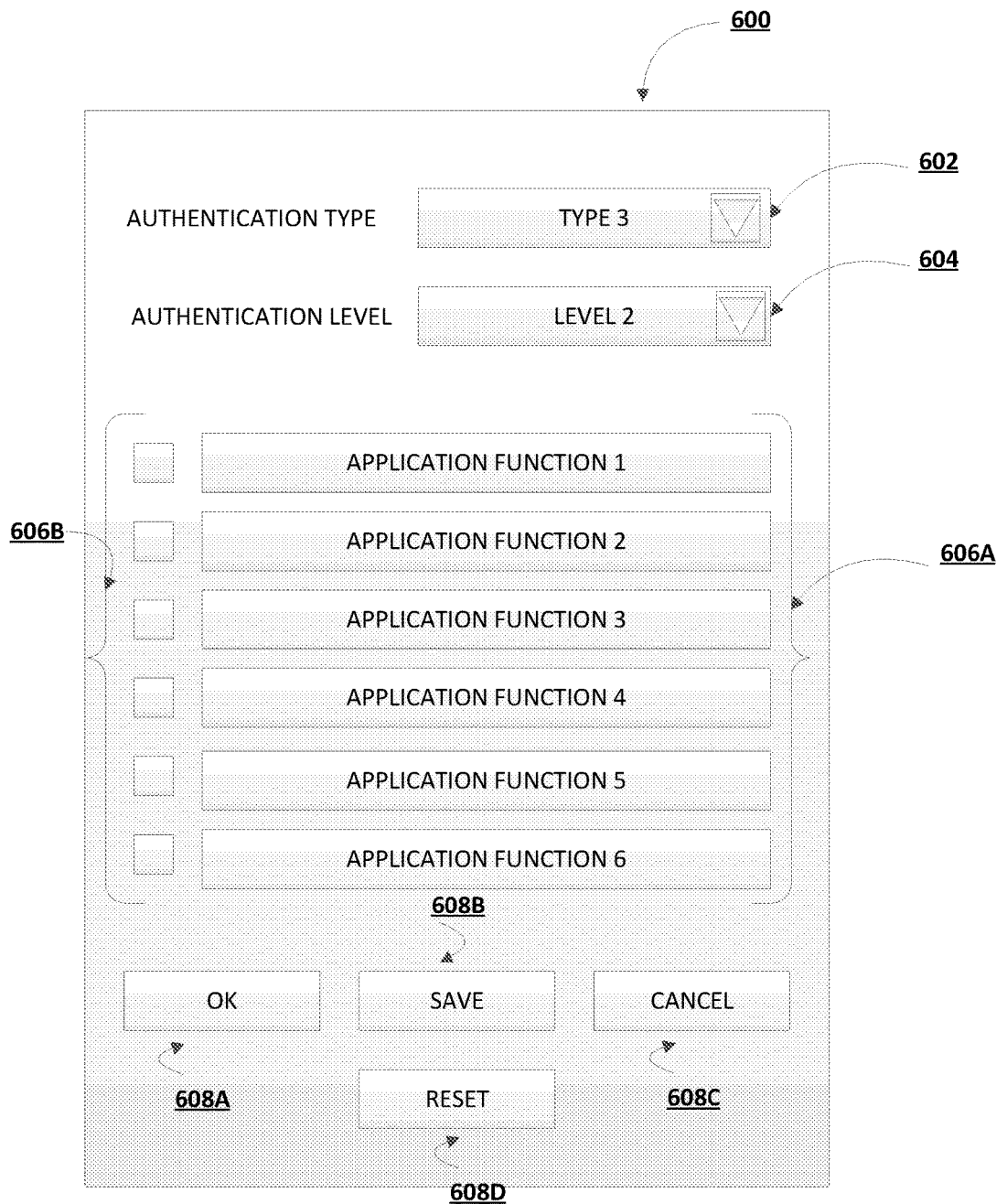

FIG. 6 illustrates an exemplary user interface in accordance to one embodiment of the invention.

DETAILED DESCRIPTION OF THE INVENTION

Embodiments of the present invention now may be described more fully hereinafter with reference to the accompanying drawings, in which some, but not all, embodiments of the invention are shown. Indeed, the invention may be embodied in many different forms and should not be construed as limited to the embodiments set forth herein; rather, these embodiments are provided so that this disclosure may satisfy applicable legal requirements. Like numbers refer to like elements throughout.

In some embodiments, an "entity" as used herein may be any organization or enterprise that has a collective goal and is linked to an external environment. In some embodiments, an entity may be a business entity, a merchant, or corporation. In some other embodiments, an entity may be a financial institution. A "financial institution" may be defined as any organization, entity, or the like in the business of moving, investing, or lending money, dealing in financial instruments, or providing financial services. This may include commercial banks, thrifts, federal and state savings banks, savings and loan associations, credit unions, investment companies, insurance companies and the like. In some embodiments, the entity may allow a user to establish an account with the entity. An "account" may be the relationship that the user has with the entity. Examples of accounts include a deposit account, such as a transactional account (e.g. a banking account), a savings account, an investment account, a money market account, a time deposit, a demand deposit, a pre-paid account, a credit account, a non-monetary user profile that includes only personal information associated with the user, or the like. The account is associated with and/or maintained by an entity. In other embodiments, an "entity" may not be a financial institution.

As used herein, the "user" may be an account holder or a person who has an account (e.g., banking account, credit account, or the like)), an employee (e.g., an underwriter, a project manager, an IT specialist, a manager, an administrator, an internal operations analyst, or the like).

As used herein, an "application" may be computer software that causes a computer to perform useful tasks beyond the running of the computer itself. A specific instance of such software is called a software application, application program application, or an application. In some embodiments, an application may be a banking application. Typically, a banking application is allowed to interface with commercial entities to connect to other modular software and to the interbank networks. In some embodiments, a banking application may also refer to trading software used by investment banks to access capital markets. In some embodiments, an application may not be a banking application.

User authentication may be required in a variety of situations. For example, a user may be required to authenticate identity for access to an application on a computer system or a mobile device or for access to a particular feature, function or action of an application. Numerous types and levels of user authentication exist. For example, a user may authenticate his or her identity using a unique alias such as a username and/or password. Further, in some situations, challenge questions, familiar pictures and/or phrases, biometrics, key fob-based alphanumeric codes and/or collocation, authentication of another application such as a similar application or an "overarching" application, and/or the like may be used as types of identity authentication.

The different types of authentication may provide differing degrees of confidence regarding the authentication using such types. For example, if a username by itself is used for a first user authentication, and a username along with a password is used for a second authentication, then the second authentication should provide a higher confidence regarding the authentication because of the additional layer of authentication required. Further, within the types of authentication, varying levels of confidence may be used. For example, when using a password, an administrator may require users to create a password according to strict rules designed to increase the security level of the password, and therefore increase the confidence of any authentication using the password.

Accordingly, a continuum of authentication may be used to quantify (or dictate) the levels of authentication. Likewise, a continuum of functions permitted may be used to quantify (or dictate) the number or context in which functions are permitted.

Referring to FIG. 1A, a continuum of authentication 100A is illustrated according to embodiments of the invention. On the left-hand side of the continuum, a "zero authentication" requires no authentication credentials. On the right-hand side of the continuum, a "hard authentication" requires full authentication credentials. This means that it requires the strictest combination of credentials. In between the two extremes, "a soft authentication" requires minimal credentials, moderate credentials or most credentials for various points along the continuum. The continuum generally represents the number of credentials required and/or the relative strength of the credentials required for that point on the continuum. As discussed below with reference to FIG. 1C, the continuum of authentication 100A may be coupled with an application functions permitted continuum 100B, first illustrated in FIG. 1B.

Referring to FIG. 1B, the application functions permitted continuum 100B illustrates various levels of application functions permitted. Functions may refer to what a user is permitted to "see" and/or what the user is permitted to "do". More specifically, this may refer to whether a specific function is permitted at a certain point on the continuum and/or the context in which a certain function is permitted. The left-hand side of the continuum indicates that no functions are permitted, and the right-hand side of the continuum indicates that all functions are permitted. In between the extremes, minimal functions are permitted, moderate functions are permitted and most functions are permitted. Thus, any given point along the continuum 100B corresponds with a certain amount and/or number of functions that are permitted and/or the context in which certain functions are permitted.

Referring now to FIG. 1C, a diagram 100C illustrates a coupling of the application functions permitted continuum 100B and the levels of authentication continuum 100A. As shown, the continua 100B and 100A may be coupled with one another such that the various points along the continua intersect at specific points of the coupled continuum. For example, one continuum may be moved left or right with respect to the other continuum in order to achieve a different relationship between the functions permitted and the credentials required. Accordingly, for a given coupling, a specific point on continuum 100B provides that a particular function or functions may be permitted given that a specified level of authentication credentials are supplied, as indicated by the corresponding point on continuum 100A. For example, a financial institution and/or a user may arrange the continua 100B and 100A with respect to one another and may adjust the arrangement based on changing desires or goals.

In some embodiments, one or both the continua 100B and 100A may have weighted scales such that, as a point on the continuum is moved, the corresponding functions permitted and/or level of authentication required may change exponentially or otherwise. Furthermore, in various embodiments, other representations of the various functions permitted that correspond with the various levels of authentication may be used by the invention.

Referring now to FIG. 1D, a diagram 100D illustrates a relationship between the functions permitted and the authentication types. As shown in FIG. 1D, the soft authentication continuum between zero authentication and hard authentication may include one or more authentication types (A, B, C in the Figure). In one aspect, the one or more authentication types corresponding to the one or more authentication credentials received from the user and one or more functions associated with the application permitted for user access are positively correlated. For example, a username may enable the user to gain access to checking balance, a username and password may enable the user to gain access to checking balance, funds transfer between the user's first bank account and second bank account, and downloading previous statements, and a username, password and challenge question may enable the user to gain complete access to all the application functions. In one aspect, the user may have to provide authentication credentials corresponding to authentication types A and B to gain access to moderate functions associated with the application. For example, the user may provide a username and password to access a balance check and funds transfer. In another aspect, the user may have to provide authentication credentials corresponding to authentication types A, B, and C to gain access to most function associated with the application. For example, the user may provide a username, password, and a personal identification number to access a balance check, a funds transfer, a deposit, and a bill-pay. In yet another aspect, the user may have to only provide authentication credentials corresponding to authentication type A to gain access to minimal functions associated with the application. For example, the user may provide a username to access a balance check.

Referring now to FIG. 2, a network environment 200 is illustrated in accordance with one embodiment of the present invention. As illustrated in FIG. 2, the network system 208 is operatively coupled, via a network 201 to the mobile device 204 and/or 206. In this configuration, the network system 208 may send information to and receive information from the mobile device devices 204 and/or 206. The network system 208 may be or include one or more network base stations or other network components. FIG. 2 illustrates only one example of an embodiment of a network environment 200, and it will be appreciated that in other embodiments one or more of the systems, devices, or servers may be combined into a single system, device, or server, or be made up of multiple systems, devices, or servers.

The network 201 may be a global area network (GAN), such as the Internet, a wide area network (WAN), a local area network (LAN), a telecommunication network or any other type of network or combination of networks. The network 201 may provide for wireline, wireless, or a combination wireline and wireless communication between devices on the network 201.

In some embodiments, the users 202 and 205 are individuals who maintain cellular products with one or more providers. As illustrated in FIG. 2, the network system 208 generally comprises a communication device 246, a processing device 248, and a memory device 250. As used herein, the term "processing device" generally includes circuitry used for implementing the communication and/or logic functions of the particular system. For example, a processing device may include a digital signal processor device, a microprocessor device, and various analog-to-digital converters, digital-to-analog converters, and other support circuits and/or combinations of the foregoing. Control and signal processing functions of the system are allocated between these processing devices according to their respective capabilities. The processing device may include functionality to operate one or more software programs based on computer-readable instructions thereof, which may be stored in a memory device.

The processing device 248 is operatively coupled to the communication device 246 and the memory device 250. The processing device 248 uses the communication device 246 to communicate with the network 201 and other devices on the network 201. As such, the communication device 246 generally comprises a modem, server, or other device for communicating with other devices on the network 201.

As further illustrated in FIG. 2, the network system 208 comprises computer-readable instructions 254 stored in the memory device 250, which in one embodiment includes the computer-readable instructions 254 of an application 258. In some embodiments, the memory device 250 includes data storage 252 for storing data related to and/or used by the application 258. The application 258 may perform a user authentication by performing one or more of the steps and/or sub-steps discussed herein.

As illustrated in FIG. 2, the mobile device 206 generally comprises a communication device 236, a processing device 238, and a memory device 240. The processing device 238 is operatively coupled to the communication device 236 and the memory device 240. In some embodiments, the processing device 238 may send or receive data from the mobile device 204, and/or the network system 208 via the communication device 236 over a network 201. As such, the communication device 236 generally comprises a modem, server, or other device for communicating with other devices on the network 201.

As further illustrated in FIG. 2, the mobile device 206 comprises computer-readable instructions 242 stored in the memory device 240, which in one embodiment includes the computer-readable instructions 242 of an application 244. In the embodiment illustrated in FIG. 2, the application 244 allows the mobile device 206 to be linked to the network system 208 to communicate, via a network 201. The application 244 may also allow the mobile device 206 to connect directly (i.e., locally or device to device) with the mobile device 204 for proximity services (e.g., using either cellular based links or non-cellular based links). The application 244 may perform a user authentication by performing one or more of the steps and/or sub-steps discussed herein.

In various embodiments, the level of user authentication may also be based in part on validating an identity of the mobile device of the user. Such verification can be incorporated into the close network score or into a unique identity score that is combined with the close network score in order to determine the appropriate level of authentication required for a requested action/function. The identity of the mobile device may be determined in a variety of ways. For example, the level of user authentication may also be based in part on validating an identity of the mobile device of the user. Such verification can be incorporated into the close network score or into a unique identity score that is combined with the close network score in order to determine the appropriate level of authentication required for a requested action/function. The identity of the mobile device may be determined in a variety of ways. For example, a particular mobile device 206 may be identified by gathering device identification information from the mobile device 206 to generate the device's "fingerprint," or unique signature of the mobile device 206. Device identification information may be collected from a variety of sources. In some embodiments, the device identification information includes an identification code. The identification code may be but is not limited to a serial number or an item number of the device. In some embodiments, the device identification information may be associated with a chip associated with the mobile device. The chip may be but is not limited to a subscriber identification module (SIM) card, removable hard drive, processor, microprocessor, or the like. In other embodiments, the device identification information may be associated with a removable part of the mobile device 206. Removable parts include but are not limited to detachable keyboards, battery covers, cases, hardware accessories, or the like. Removable parts may contain serial numbers or part numbers. In alternative embodiments, a unique key, code, or piece of software provided by a financial institution may be downloaded onto the mobile device 206. This unique key, code, or piece of software may then serve as device identification information. Typically, the device identification information (e.g., a serial number, an identification code, an International Mobile Station Equipment Identity (IMEI), a phone number, a chip, a removable part, or similar pieces of device identification information) is collected from the mobile device 206 without requiring user input. For example, the device identification information may be automatically provided by the mobile device 206. Alternatively, the mobile device 206 may provide the information without requiring user input after receiving a request from a system for the identification information. In other embodiments, device identification information may be entered manually at the mobile device 206. For example, if the mobile device's serial number cannot be automatically located (perhaps due to interference, long range, or similar hindrance), the user may be prompted for manual entry of the serial number (or an identification code, an International Mobile Station Equipment Identity (IMEI), a phone number, a chip, a removable part, or similar pieces of device identification information). The device identification information may be stored and subsequently used to identify the mobile device 206.

It is understood that the servers, systems, and devices described herein illustrate one embodiment of the invention. It is further understood that one or more of the servers, systems, and devices can be combined in other embodiments and still function in the same or similar way as the embodiments described herein.

Referring now to FIG. 3, a high level process flow is illustrated for a user authentication based on self-selected preferences. In some embodiments, the system may be configured to receive from a user, a request to execute a user action associated with an application, wherein the execution of the user action requires validation of one or more authentication credentials, as shown in block 302. Typically, the application may include one or more functions. For example, a mobile financial application may include functions such as a funds transfer, a check deposit, a balance check, a bill pay, or the like. In another example, the user action may be checking account balance, executing a money transfer, initiating a bill pay to a merchant, or the like.

In response to receiving a request from the user, the system may be configured to access a user selected preference, wherein the user selected preference comprises a level of authentication desired by the user, as shown in block 304. In response to accessing the user-selected preference, the system may be configured to determine which one or more authentication types from a plurality of authentication types are associated with the level of authentication associated with the user selected preference, as shown in block 306. As illustrated in at least FIG. 1A, the one or more authentication levels may include a hard authentication, a soft authentication, and a zero authentication. In one aspect, the authentication types may include a username, a password, a personal identification number, biometric data, or the like. In some embodiments, each authentication level may include one or more authentication types in the continuum of authentication.

In response to determining one or more authentication types, the system may be configured to request one or more authentication credentials corresponding to the determined one or more authentication types, as shown in block 308. In response to requesting one or more authentication credentials, the system may be configured to receive one or more authentication credentials from the user and validate the one or more authentication credentials, thereby resulting in a successful validation of the one or more authentication credentials, as shown in block 310. In response to successful validation of the one or more authentication credentials, the system may then be configured to execute the user action, as shown in block 312. In one aspect, a successful validation may include determining a successful match between the one or more authentication credentials received from the user and the one or more authentication credentials stored in a database, wherein the one or more authentication credentials correspond to the one or more authentication types associated with the level of authentication.

Referring now to FIG. 4, a process flow is illustrated for applying an access level associated with an authentication type to an application based on the functions permitted continuum illustrated in at least FIG. 1B. In some embodiments, the system may be configured to receive a user-selected preference associated with the one or more authentication types, as shown in block 404. In some embodiments, the one or more authentication types associated with the level of authentication may include a hard authentication, a soft authentication, and a zero authentication. In one aspect, the hard authentication is a multi-step verification of at least two authentication types, wherein verification further comprises receiving a user input of at least two authentication credentials. In some embodiments, a successful validation of at least two authentication credentials presented by the user associated with a hard authentication may enable the user to have full and complete access to all of the features/functions of the application.

In another aspect, the successful validation of at least one authentication credential presented by the user associated with a soft authentication may enable the user to gain partial access to one or more functions of the application in the function permitted continuum of FIG. 1C. For example, with the successful validation of soft authentication, the system may be configured to enable the user to gain access to functions such as "checking balance", "viewing the past five transactions", or the like. In yet another aspect, the zero authentication comprises restricting the user from access to the application after a predetermined number of authentication attempts to access the application. In some embodiments, the system may be configured to place a provisional flag on the application after exhaustion of a predetermined number of authentication attempts to access the application, wherein placing a provisional flag comprises notifying the user using a secondary means for contact. In one aspect, a secondary means for contact associated with the user may be at least one of a phone number, an email, a postal mail, or the like.

In one aspect, the user selected preference may include a time duration. The time duration is defined by a user selection of a first time stamp and a second time stamp. In one aspect, the first time stamp and the second time stamp may define the boundaries of application of the level of authentication. For example, the user may desire a zero authentication at specific times of the day such as a time duration associated with a commute between the user's home and the user's office to ensure safety while driving. In another aspect, the user selected preference includes a geographic location. In some embodiments, the geographic location may be a specific location or point located within a geographic radius. In one aspect, the geographic radius defines the boundary of application of the level of authentication. In one aspect, the geographic radius may be customizable. In another aspect, the geographic radius may be fixed. For example, the user may desire a soft authentication at secure locations such as the user's home and the user's office. In these secure locations, the user may choose to configure the system to provide the user with a full access to the application even with a soft authentication. In another example, the user may desire a hard authentication at locations substantially new to the user, such as a different neighborhood, a different city, a different state, or the like.

In response to receiving the user-selected preference, the system may be configured to apply the one or more authentication types to the application based on at least the user-selected preference, as shown in block 406. In response to applying the one or more authentication types to the application, the system may be configured to apply an access level based on at least the application of the one or more authentication types, as shown in block 408. For example, the system may be configured to apply a soft authentication to an application at the user's home enabling the user with full access to all the functions in the application. In another example, the system may be configured to apply a hard authentication to an application when the user is found to be in a particular geographic location. In yet another example, the system may be configured to apply a soft authentication to the application when the user-selected preference includes a time duration defined by the first time stamp and a second time stamp, when the first and second time stamp is associated with a user's travel plan. In some embodiments, the user may desire a combination of hard authentication, soft authentication, and a zero authentication in an application based on at least a geographic location, a time duration, or the like.

Referring now to FIG. 5, a process flow for self-selected user access based on specific authentication types 500 is illustrated. In some embodiments, the system may be configured to receive a user-selected preference, wherein the user-selected preference may be one or more authentication types desired by the user, as shown in block 502. In response to receiving one or more authentication types, the system may be configured to determine a level of authentication from a plurality of levels of authentication associated with the one or more authentication types associated with the user-selected preference, as shown in block 504. For example, the user may be comfortable using only the username to access a mobile application associated with a financial institution at a public place such as a stadium. In such situations, the system may be configured to determine that the authentication level associated with the username is a soft authentication. In response, the system may then be configured to initiate the presentation of a user interface that enables the user to select one or more application functions, wherein the one or more application functions are associated with the determined level of authentication, as shown in block 506. For example, the system may determine that the user may access application functions such as determining current balance, retrieving a previous statement, view help/options, read terms and conditions, view one or more stored financial institution account identifiers, or the like and initiate the presentation of a user interface to enable a user selection of one or more of the application functions.

In response, the system may then receive from a user, a selection of one or more application functions, as shown in block 508. For example, the user may choose to access application functions related to current balance associated with the financial institution account with a valid username. In one aspect, the user may determine application access on a real-time basis based on at least one of a geographic location, a time duration, or the like. For example, if the user has multiple accounts with the same financial institution, the user may want to gain access to the account identifiers in a recognizable geographic location such as a user's office space defined by a geographic radius. In another example, the user may choose not to gain access to the account identifiers in a public place such as a stadium for security purposes. In another aspect, the user may choose to not have access to application functions even with valid authentication credentials associated with the determined authentication level during a particular time period determined by defined by a first time stamp and a second time stamp. For example, the user may be an online shopping enthusiast who is usually tempted to shop for products and services immediately after work and before beginning household chores. In such situations, the user may choose a particular time period for limited access to application functions in an attempt to curtail expenses and budget better. In one aspect, a user selection of one or more application functions may be selecting one or more check boxes corresponding to the one or more application functions presented to the user. In another aspect, a user selection of one or more application functions may include a selection of one or more application functions from a drop down box. In yet another aspect, a user selection of one or more application functions may include an option to save the selection. In some embodiments, the saved selection may be saved in memory to enable the user to choose the saved option directly instead of having to go through the process of selecting the one or more application functions again.

In one aspect, receiving the selection further comprises receiving a request to execute the selected one or more applications, wherein execution of user action requires validation of one or more authentication credentials. In response to receiving a user selection, the system may then be configured to execute the user action based on a successful validation of the one or more authentication credentials, as shown in block 510. In some embodiments, the system may be configured to enable the user to reset the one or more application functions selected.

Referring now to FIG. 6, an exemplary user interface 600 is illustrated in accordance with one embodiment of the invention. In some embodiments, the user interface may include an authentication type 602, an authentication level 604, one or more application functions 606, and one or more options 608. In one aspect, the system may be configured to receive a user selection of one or more authentication types from a dropdown list of authentication types 602. In response, the system may identify an authentication level from a plurality of authentication levels corresponding to the authentication type at 604. In some embodiments, the system may then provide the user with one or more application functions associated with the authentication level 604 as determined by the system based on at least the authentication type 602. The user may choose one or more authentication functions 606A by selecting one or more check boxes 606B corresponding to the one or more authentication functions 606A. In response to selecting one or more application functions, the user may then choose to either acknowledge the selection by choosing 608A, cancel the selection by choosing 608C, or reset the choices by selecting 608D. In some embodiments, the system may be configured to enable the user to save the selection for a future use/reuse by choosing option 608B.

In accordance with embodiments of the invention, the term "module" with respect to a system may refer to a hardware component of the system, a software component of the system, or a component of the system that includes both hardware and software. As used herein, a module may include one or more modules, where each module may reside in separate pieces of hardware or software.

Although many embodiments of the present invention have just been described above, the present invention may be embodied in many different forms and should not be construed as limited to the embodiments set forth herein; rather, these embodiments are provided so that this disclosure will satisfy applicable legal requirements. Also, it will be understood that, where possible, any of the advantages, features, functions, devices, and/or operational aspects of any of the embodiments of the present invention described and/or contemplated herein may be included in any of the other embodiments of the present invention described and/or contemplated herein, and/or vice versa. In addition, where possible, any terms expressed in the singular form herein are meant to also include the plural form and/or vice versa, unless explicitly stated otherwise. Accordingly, the terms "a" and/or "an" shall mean "one or more," even though the phrase "one or more" is also used herein. Like numbers refer to like elements throughout.

As will be appreciated by one of ordinary skill in the art in view of this disclosure, the present invention may include and/or be embodied as an apparatus (including, for example, a system, machine, device, computer program product, and/or the like), as a method (including, for example, a business method, computer-implemented process, and/or the like), or as any combination of the foregoing. Accordingly, embodiments of the present invention may take the form of an entirely business method embodiment, an entirely software embodiment (including firmware, resident software, micro-code, stored procedures in a database, or the like), an entirely hardware embodiment, or an embodiment combining business method, software, and hardware aspects that may generally be referred to herein as a "system." Furthermore, embodiments of the present invention may take the form of a computer program product that includes a computer-readable storage medium having one or more computer-executable program code portions stored therein. As used herein, a processor, which may include one or more processors, may be "configured to" perform a certain function in a variety of ways, including, for example, by having one or more general-purpose circuits perform the function by executing one or more computer-executable program code portions embodied in a computer-readable medium, and/or by having one or more application-specific circuits perform the function.

It will be understood that any suitable computer-readable medium may be utilized. The computer-readable medium may include, but is not limited to, a non-transitory computer-readable medium, such as a tangible electronic, magnetic, optical, electromagnetic, infrared, and/or semiconductor system, device, and/or other apparatus. For example, in some embodiments, the non-transitory computer-readable medium includes a tangible medium such as a portable computer diskette, a hard disk, a random access memory (RAM), a read-only memory (ROM), an erasable programmable read-only memory (EPROM or Flash memory), a compact disc read-only memory (CD-ROM), and/or some other tangible optical and/or magnetic storage device. In other embodiments of the present invention, however, the computer-readable medium may be transitory, such as, for example, a propagation signal including computer-executable program code portions embodied therein.

One or more computer-executable program code portions for carrying out operations of the present invention may include object-oriented, scripted, and/or unscripted programming languages, such as, for example, Java, Perl, Smalltalk, C++, SAS, SQL, Python, Objective C, JavaScript, and/or the like. In some embodiments, the one or more computer-executable program code portions for carrying out operations of embodiments of the present invention are written in conventional procedural programming languages, such as the "C" programming languages and/or similar programming languages. The computer program code may alternatively or additionally be written in one or more multi-paradigm programming languages, such as, for example, F#.

Some embodiments of the present invention are described herein with reference to flowchart illustrations and/or block diagrams of apparatus and/or methods. It will be understood that each block included in the flowchart illustrations and/or block diagrams, and/or combinations of blocks included in the flowchart illustrations and/or block diagrams, may be implemented by one or more computer-executable program code portions. These one or more computer-executable program code portions may be provided to a processor of a general purpose computer, special purpose computer, and/or some other programmable data processing apparatus in order to produce a particular machine, such that the one or more computer-executable program code portions, which execute via the processor of the computer and/or other programmable data processing apparatus, create mechanisms for implementing the steps and/or functions represented by the flowchart(s) and/or block diagram block(s).

The one or more computer-executable program code portions may be stored in a transitory and/or non-transitory computer-readable medium (e.g. a memory) that can direct, instruct, and/or cause a computer and/or other programmable data processing apparatus to function in a particular manner, such that the computer-executable program code portions stored in the computer-readable medium produce an article of manufacture including instruction mechanisms which implement the steps and/or functions specified in the flowchart(s) and/or block diagram block(s).

The one or more computer-executable program code portions may also be loaded onto a computer and/or other programmable data processing apparatus to cause a series of operational steps to be performed on the computer and/or other programmable apparatus. In some embodiments, this produces a computer-implemented process such that the one or more computer-executable program code portions which execute on the computer and/or other programmable apparatus provide operational steps to implement the steps specified in the flowchart(s) and/or the functions specified in the block diagram block(s). Alternatively, computer-implemented steps may be combined with, and/or replaced with, operator- and/or human-implemented steps in order to carry out an embodiment of the present invention.

While certain exemplary embodiments have been described and shown in the accompanying drawings, it is to be understood that such embodiments are merely illustrative of and not restrictive on the broad invention, and that this invention not be limited to the specific constructions and arrangements shown and described, since various other changes, combinations, omissions, modifications and substitutions, in addition to those set forth in the above paragraphs, are possible. Those skilled in the art will appreciate that various adaptations, modifications, and combinations of the just described embodiments can be configured without departing from the scope and spirit of the invention. Therefore, it is to be understood that, within the scope of the appended claims, the invention may be practiced other than as specifically described herein.

To supplement the present disclosure, this application further incorporates entirely by reference the following commonly assigned patent applications:

| PMN | Docket Number | Title | Filed On | Ser. No. |
| --- | --- | --- | --- | --- |
| 6015US1 | 014033-002098 | DETERMINING USER AUTHENTICATION REQUIREMENTS BASED ON THE CURRENT LOCATION OF THE USER IN COMPARISON TO A USERS'S TRAVEL ROUTE | Feb. 7, 2014 | 14/175,639 |
| 6015US2 | 014033-002099 | DETERMINING USER AUTHENTICATION REQUIREMENTS BASED ON THE CURRENT LOCATION OF THE USER IN COMPARISON TO THE USERS'S NORMAL BOUNDARY OF LOCATION | Feb. 7, 2014 | 14/175,643 |
| 6015US3 | 014033-002100 | DETERMINING USER AUTHENTICATION REQUIREMENTS BASED ON THE CURRENT LOCATION OF THE USER BEING WITHIN A PREDETERMINED AREA REQUIRING ALTERED AUTHENTICATION REQUIREMENTS | Feb. 7, 2014 | 14/175,646 |
| 6016US1 | 014033-002101 | USER AUTHENTICATION BASED ON HISTORICAL TRANSACTION DATA | Feb. 7, 2014 | 14/175,701 |
| 6017US1 | 014033-002102 | USER AUTHENTICATION BASED ON HISTORICAL USER BEHAVIOR | Feb. 7, 2014 | 14/175,947 |
| 6018US1 | 014033-002103 | USER AUTHENTICATION BY GEO-LOCATION AND PROXIMITY TO USER'S CLOSE NETWORK | Feb. 7, 2014 | 14/175,954 |
| 6019US1 | 014033-002106 | USER AUTHENTICATION BASED ON OTHER APPLICATIONS | Feb. 7, 2014 | 14/175,863 |
| 6020US1 | 014033-002107 | USER AUTHENTICATION BASED ON FOB/INDICIA SCAN | Feb. 7, 2014 | 14/175,615 |

-continued

| PMN | Docket Number | Title | Filed On | Ser. No. |
|---|---|---|---|---|
| 6021US1 | 014033-002108 | USER AUTHENTICATION BASED ON SELF-SELECTED PREFERENCES | Feb. 7, 2014 | 14/175,688 |
| 6022US1 | 014033-002109 | SHUTTING DOWN ACCESS TO ALL USER ACCOUNTS | Feb. 7, 2014 | 14/175,136 |
| 6023US1 | 014033-002110 | PROVIDING AUTHENTICATION USING PREVIOUSLY-VALIDATED AUTHENTICATION CREDENTIALS | Feb. 7, 2014 | 14/175,146 |
| 6024US1 | 014033-002111 | DETERMINING AUTHENTICATION REQUIREMENTS ALONG A CONTINUUM BASED ON A CURRENT STATE OF THE USER AND/OR THE SERVICE REQUIRING AUTHENTICATION | Feb. 7, 2014 | 14/175,652 |
| 6025US1 | 014033-002126 | SORTING MOBILE BANKING FUNCTIONS INTO AUTHENTICATION BUCKETS | Feb. 7, 2014 | 14/175,956 |
| 6025US2 | 014033-002127 | AUTHENTICATION LEVEL OF FUNCTION BUCKET BASED ON CIRCUMSTANCES | Feb. 7, 2014 | 14/175,962 |
| 6034US1 | 014033-002115 | REMOTE REVOCATION OF APPLICATION ACCESS BASED ON LOST OR MISAPPROPRIATED CARD | Feb. 7, 2014 | 14/175,771 |
| 6034US2 | 014033-002116 | REVOCATION OF APPLICATION ACCESS BASED ON NON-CO-LOCATED | Feb. 7, 2014 | 14/175,786 |

What is claimed is:

1. A system for self-selected user access based on specific authentication types, the system comprising:
at least one processor;
at least one memory;
a module stored in memory executable by the at least one processor, and configured to execute computer-readable code to cause the at least one processor to:
receive from a user, a user-selected preference that is predefined, wherein the user-selected preference comprises: 1) one or more authentication types desired by the user, and 2) parameters that must be satisfied prior to access to use of one or more application functions associated with the user-selected preference, said parameters comprising: a time duration defined by a selection of a first time stamp and a second time stamp, a geographic location, and one or more features associated with the application, wherein the time duration is scheduled dynamically;
determine a level of authentication from a plurality of levels of authentication are associated with the one or more authentication types associated with the user-selected preference, wherein the one or more authentication levels comprises at least one of a hard authentication, a soft authentication, and a zero authentication, wherein the hard authentication is a multi-step verification requiring a user presentation of at least two authentication credentials, wherein the soft authentication is a secondary verification requiring a user presentation of at least one authentication credential associated with the authentication types, wherein zero authentication requires no authentication credentials;
initiate the presentation of a user interface that enables the user to select one or more application functions, wherein the one or more application functions are associated with the determined level of authentication;
receive from a user, a selection of one or more application functions, wherein receiving the selection further comprises receiving a request to execute the selected one or more application functions, wherein execution of the user action requires validation of one or more authentication credentials;
determine that the parameters associated with the user-selected preferences are satisfied;
request one or more authentication credentials corresponding to the desired one or more authentication types based on at least determining that at least one of the user-selected preferences are satisfied;
receive one or more authentication credentials from the user;
validate the one or more authentication credentials, thereby resulting in a successful validation of the one or more authentication credentials; and
in response to the successful validation of the one or more authentication credentials, execute the selected one or more application functions, wherein executing the selected one or more authentication credentials further comprises enabling the user to access at least a portion of the application, wherein the portion of the application is based on at least the one or more features associated with the application, wherein the one or more features are pre-selected by the user based on the user selected preferences.

2. The system of claim 1, wherein the one or more authentication credentials received from the user and one or more functions associated with the application permitted for user access are positively correlated.

3. The system of claim 1, wherein the user-selected preference comprises a geographic location, wherein the geographic location is a point within a geographic radius, wherein the geographic radius defines the boundary of application of the level of authentication.

4. The system of claim 1, wherein validating further comprises determining a successful match between the one or more authentication credentials received from the user and the one or more authentication credentials stored in a database, wherein the one or more authentication credentials correspond to the one or more authentication types associated with the level of authentication.

5. The system of claim 1, wherein hard authentication comprises enabling a user to access all functions associated with the application based on at least a successful validation of the one or more authentication credentials associated with the user.

6. The system of claim 1, wherein the hard authentication comprises a multi-step verification of at least two authentication types, wherein verification further comprises receiving a user input of at least two authentication credentials.

7. The system of claim 1, wherein the authentication type associated with the multi-step verification is at least one of a username, a password, a personal identification number, or a biometric indicia.

8. The system of claim 1, wherein soft authentication comprises enabling a user to access one or more functions associated with the application based on at least a successful validation of the one or more authentication credentials associated with the user.

9. The system of claim 1, wherein the soft authentication comprises a secondary verification of at least one authentication type, wherein verification further comprises receiving a user input of at least one authentication credential.

10. The system of claim 9, wherein the at least one authentication type associated with the secondary verification comprises at least one of a social media authentication, an internet protocol (IP) based authentication, a fob, or a signed digital certificate.

11. The system of claim 1, wherein the zero authentication comprises restricting the user from access to the application after a predetermined number of authentication attempts to access the application.

12. The system of claim 11, wherein the module is configured to place a provisional flag on the application after exhaustion of a predetermined number of authentication attempts to access the application, wherein placing a provisional flag comprises notifying the user using a secondary means for contact.

13. The system of claim 1, wherein the user interface enables the user to select one or more application functions associated with the determined level of authentication corresponding to the authentication type desired.

14. The system of claim 13, wherein the user interface enables the user to reset the selected one or more application functions thereby removing restrictions on access to the one or more application functions.

15. The system of claim 13, wherein the user interface enables the user to save the selected one or more application functions for use at a future date.

16. The system of claim 13, wherein the user interface enables the user to acknowledge the selection of one or more application function or cancel the selection of one or more application functions.

* * * * *